United States Patent [19]

Hemler, Jr. et al.

[11] 4,148,751

[45] Apr. 10, 1979

[54] METHOD OF REGENERATING COKE-CONTAMINATED CATALYST WITH SIMULTANEOUS COMBUSTION OF CARBON MONOXIDE

[75] Inventors: Charles L. Hemler, Jr., Mt. Prospect; Laurence O. Stine, Western Springs, both of Ill.

[73] Assignee: UOP Inc., Des Plaines, Ill.

[21] Appl. No.: 697,074

[22] Filed: Jun. 17, 1976

Related U.S. Application Data

[63] Continuation-in-part of Ser. No. 654,260, Feb. 2, 1976, abandoned.

[51] Int. Cl.$^2$ .................... B01J 21/20; B01J 23/96; B01J 29/38; C10G 11/04
[52] U.S. Cl. .................... 252/419; 208/113; 208/120; 208/164; 252/416; 252/417
[58] Field of Search .................... 252/416, 417, 419; 208/113, 120, 164

[56] References Cited

U.S. PATENT DOCUMENTS

| | | | |
|---|---|---|---|
| 2,436,927 | 3/1948 | Kassel | 252/417 |
| 3,232,711 | 2/1966 | Senyk | 252/419 |
| 3,364,136 | 1/1968 | Chem | 208/120 |
| 3,649,521 | 3/1972 | Martin | 208/120 |
| 3,650,990 | 3/1972 | Frillete | 252/455 Z |
| 3,696,025 | 10/1972 | Chessmore | 208/113 |
| 3,788,977 | 1/1974 | Dolbear | 208/120 |
| 3,808,121 | 4/1974 | Wilson, Jr. et al. | 208/113 |
| 3,849,291 | 11/1974 | Owen | 208/120 |
| 3,856,659 | 12/1974 | Owen | 252/417 |
| 3,894,934 | 7/1975 | Owen et al. | 252/417 |
| 3,909,392 | 9/1975 | Horecky, Jr. et al. | 252/417 |
| 3,926,778 | 12/1975 | Owen et al. | 252/476 |
| 4,006,075 | 2/1977 | Luckehbach | 252/417 |
| 4,072,600 | 2/1978 | Schwartz | 252/417 |

FOREIGN PATENT DOCUMENTS

| | | | |
|---|---|---|---|
| 2444911 | 4/1975 | Fed. Rep. of Germany | 252/417 |
| 2507343 | 9/1975 | Fed. Rep. of Germany | 252/417 |

*Primary Examiner*—Winston A. Douglas
*Assistant Examiner*—P. E. Konopka
*Attorney, Agent, or Firm*—Hoatson, Jr. James R.; Thomas K. McBride; William H. Page, II

[57] ABSTRACT

A method for regenerating a coke-contaminated cracking catalyst with the simultaneous carefully controlled catalyzed combustion of CO to $CO_2$ within a regeneration zone to produce regenerated catalyst and flue gas. Novel features of the method include adding to the regeneration zone, independently of the cracking catalyst, a supported CO oxidation promoter and combusting CO to $CO_2$ in the presence of the promoter and regenerated catalyst. A supported oxidation promoter may be added to the regeneration zone in amounts to control the CO concentration in the flue gas, a regeneration zone temperature, or the residual carbon concentration on regenerated catalyst.

28 Claims, No Drawings

METHOD OF REGENERATING COKE-CONTAMINATED CATALYST WITH SIMULTANEOUS COMBUSTION OF CARBON MONOXIDE

CROSS REFERENCE TO RELATED APPLICATION

This application is a continuation-in-part application of our prior copending application Ser. No. 654,260 filed Feb. 2, 1976 all the teachings of which are incorporated herein by specific reference thereto.

BACKGROUND OF THE INVENTION

1. Field of the Invention

The field of art to which this invention pertains is hydrocarbon processing and more specifically to a catalytic cracking process. More particularly the present invention is concerned with a method for regenerating a coke-contaminated cracking catalyst with the simultaneous carefully controlled combustion of CO to $CO_2$ within a regeneration zone of a catalytic cracking process.

2. Prior Art

Regeneration techniques in which a coke-contaminated catalyst is regenerated in a regeneration zone occupy a large segment of the chemical arts. Particularly common are regeneration techniques used to regenerate a coke-contaminated fluidizable catalytic cracking catalyst within the regeneration zone of a fluid catalytic cracking (FCC) process. Until recent years the prior art has been primarily concerned with removing the maximum amount of coke from spent catalyst and at the same time preventing excessive temperature levels resulting from the conversion of carbon monoxide to carbon dioxide within certain portions of the regeneration zone, especially in the dilute-phase catalyst region where there is little catalyst present to absorb the heat of reaction and where heat damage to cyclones or other separation equipment can therefore result. Essentially complete CO conversion in conventional regeneration zones was prevented quite simply by limiting the amount of fresh regeneration gas passing into the regeneration zone. Without sufficient oxygen present to support the oxidation of CO to $CO_2$, afterburning simply cannot occur no matter what the temperatures in the regeneration zone. As well, temperatures in the regeneration zone were generally limited to less than about 1250° F. by selecting hydrocarbon-reaction-zone operating conditions or fresh feed streams or recycle streams or combinations thereof to limit the amount of coke on spent catalyst and hence the amount of fuel burned in the regeneration zone. The flue gas produced, containing several volume percent CO, was either vented directly to the atmosphere or used as fuel in a CO boiler located downstream of the regeneration zone. Usual FCC startup practice, familiar to those skilled in the art of FCC processes, was to initially manually regulate the flow of fresh regeneration gas to the regeneration zone in an amount insufficient to sustain essentially complete CO conversion while at the same time limiting regeneration zone temperatures to a maximum of about 1250° F. When reasonably steady-state control of the FCC process was achieved the flow rate of fresh regeneration gas was then typically regulated by instrument control directly responsive to a small temperature differential between the flue gas outlet temperature (or the dilute phase disengaging space temperature) and the dense bed temperature to maintain automatically this proper flow rate of fresh regeneration gas to preclude essentially complete conversion of CO to $CO_2$ anywhere within the regeneration zone. As the temperature difference increased beyond some predetermined temperature difference, indicating that more conversion of CO was taking place in the dilute phase, the amount of fresh regeneration gas was decreased to preclude essentially complete conversion of CO to $CO_2$. This method of control is exemplified by Pohlenz U.S. Pat. Nos. 3,161,583 and 3,206,393. While such method produces a small amount of $O_2$ in the flue gas, generally in the range of 0.1 to 1 vol.% $O_2$, it precludes essentially complete conversion of CO to $CO_2$ within the regeneration zone.

Until the advent of zeolite-containing catalysts, there was little economic incentive for essentially complete conversion of CO to $CO_2$ within the regeneration zone. The use of the zeolite-containing FCC catalysts, which are more stable thermally and which have lower coke-producing tendencies, and the use of higher hydrocarbon conversion zone temperatures, however, often made additional heat input into the FCC process desirable. Typically additional heat was provided by burning external fuel such as torch oil in the regeneration zone or by adding or increasing the amount of feed preheat in external feed preheaters. Thus heat was typically being added to and then later removed from the FCC process by two external installations, a feed preheater and a CO boiler, each representing a substantial capital investment. Catalyst regeneration processes described in the recent prior art have recognized the advantages of essentially completely converting CO to $CO_2$ and recovering at least a portion of the heat of combustion of CO both within the regeneration zone. Examples of such regeneration processes are Stine et al U.S. Pat. No. 3,844,973 and Horecky, Jr. et al U.S. Pat. No. 3,909,392. The advantages of such processes are now well known; such regeneration processes permit the reduction or elimination of feed preheat, the elimination of CO air pollution without the need for external CO boilers, and, when coupled with hydrocarbon-reaction zones of modern design, improved yields of more valuable products.

Regeneration processes employing CO conversion promoters or catalysts are not novel; indeed prior art processes for regenerating fluidizable coke-contaminated cracking catalysts have employed such promoters or catalysts. For example, in the fluid catalytic cracking process described in Kassel U.S. Pat. No. 2,436,927, which issued in 1948, a physical mixture of a cracking catalyst and discrete particles of a supported CO oxidizing catalyst comprising a metal selected from the group consisting of Cu, Cr, Mn, Co and Ni is employed in a dense-phase region of a regeneration zone to enhance CO conversion in the dense phase thus preventing "afterburning" in the dilute-phase region of the regeneration zone. In the process described in Chen U.S. Pat. No. 3,364,136, which issued in 1968, a mixture of a cracking catalyst and a shape-selective crystalline aluminosilicate containing an oxidation catalyst within its internal pore structure is used to control the $CO_2$ to CO ratio in the regeneration zone without influencing the reaction taking place in the hydrocarbon reaction zone. In the process described in Wilson U.S. Pat. No. 3,808,121 two separate catalysts of different particle size and composition are employed; a cracking catalyst and a CO oxidation catalyst preferably supported in a matrix material such as alumina spheres and monoliths. The CO oxidation component may be selected from one or more of the oxides of Cu, Cr, Ni, Mn and copper chromite. Moreover, the supported CO oxidation catalyst is confined within the regeneration zone and does not pass out of that zone to the hydrocarbon reaction zone as does the cracking catalyst. Coke and CO are oxidizing in the regeneration zone to minimize CO in the flue gas.

By the method of our invention a supported CO oxidation promoter is added to the regeneration zone independently of the cracking catalyst, coke from spent catalyst is oxidized to produce regenerated catalyst and, essentially simultaneously, CO is converted to $CO_2$ in the presence of the promoter and regenerated catalyst within the regeneration zone. Small amounts of a supported carbon monoxide oxidation promoter can be easily and precisely added to a regeneration zone in amounts to control the CO concentration in the flue gas, to control a temperature within the regeneration zone or to control the amount of residual carbon on regenerated catalyst. By way of contrast, using a cracking catalyst containing as a component some predetermined concentration of a CO oxidation promoter makes it difficult to achieve in any particular regeneration zone the optimum concentration of oxidation promoter suitable for the operating characteristics of that particular regeneration zone or required to achieve a particular change in a dependent process variable. Addition of the small amounts of a supported CO oxidation promoter by the method of our invention is therefore more economical than employing a cracking catalyst to which has been added a CO conversion promoter during the catalyst manufacturing procedure and additionally the method of our invention gives to the refiner as an operating variable which heretofore had been essentially a fixed operating condition. Thus with the method of our invention the refiner has increased operating flexibility. Our method is applicable to any fluid catalytic cracking process, existing or new.

SUMMARY OF THE INVENTION

It is accordingly, a broad objective of our invention to provide a method for regenerating a coke-contaminated catalyst with simultaneous carefully-controlled combustion of CO in a regeneration zone and in a manner to make a controlled quantity of exothermic heat of reaction available for operation of the regeneration zone and to decrease the amount of CO in the flue gas. Another objective of our invention is to provide, in a catalytic cracking process wherein coke-contaminated cracking catalyst and oxygen-containing regeneration gas are passed to a regeneration zone maintained at coke oxidizing conditions to produce a regenerated catalyst and a flue gas containing CO and $CO_2$, a method of using the in situ combustion of CO to $CO_2$ to control the operation of the regeneration zone. Other objectives of our invention are to provide, in a catalytic cracking process wherein coke-contaminated cracking catalyst and oxygen containing regeneration gas are passed to a regeneration zone maintained at coke oxidation conditions to produce a regenerated catalyst and a flue gas containing CO and $CO_2$, (1) a method of controlling the CO concentration in the flue gas within a predetermined CO concentration range; (2) a method of controlling a regeneration zone temperature within a predetermined temperature range and, (3) a method of controlling the concentration of residual carbon on regenerated catalyst within a predetermined residual carbon concentration range.

In brief summary our invention is, in one embodiment, a method for regenerating a coke-contaminated catalyst with simultaneous carefully-controlled catalyzed combustion of CO which comprises the steps of: (a) introducing coke-contaminated catalyst into a regeneration zone; (b) adding to the regeneration zone, independently of said coke-contaminated catalyst and in an amount selected to promote the combustion of CO to $CO_2$, a CO oxidation promoter selected from the group consisting of the noble metals and compounds thereof said promoter being supported on particles of alumina; (c) passing oxygen-containing regeneration gas into the regeneration zone in an amount selected to burn coke from said coke-contaminated catalyst and to provide sufficient excess oxygen to accomplish the desired amount of CO combustion; (d) reacting a first portion of the oxygen-containing regeneration gas with the coke-contaminated catalyst in the regeneration zone at oxidation conditions which are selected to remove coke from the coke-contaminated catalyst and to produce a flue gas containing CO and which are sufficient to cause combustion of CO to $CO_2$ in the presence of said oxidation promoter; and, (e) simultaneously contacting the flue gas and a second portion of the oxygen-containing regeneration gas with the CO oxidation promoter in the regeneration zone in the presence of regenerated catalyst at said oxidation conditions, thereby (i) making a controlled quantity of exothermic heat of reaction available for operation of said regeneration zone and (ii) decreasing the amount of CO in flue gas.

In brief summary our invention is, in another embodiment, in a process for catalytically cracking a hydrocarbon feed stream wherein coke-contaminated cracking catalyst and oxygen-containing regeneration gas are passed to a regeneration zone maintained at coke oxidizing conditions wherein coke is oxidized to produce a regenerated catalyst and a flue gas containing CO and $CO_2$, a method of using the in situ combustion of CO to $CO_2$ to control the operation of the regeneration zone which comprises the steps of: (a) passing to said regeneration zone, independently of said coke-contaminated catalyst and in an amount selected to initiate and sustain the combustion of CO to $CO_2$ in said zone in the presence of regenerated catalyst, a CO oxidation promoter selected from the group consisting of the noble metals and compounds thereof said promoter being supported on particles of alumina; and, (b) thereafter adjusting the amount of oxygen-containing regeneration gas being passed to said zone to a value stoichiometrically sufficient to burn the coke from the catalyst and to convert at least a portion of the CO to $CO_2$, thereby (i) making a controlled quantity of exothermic heat of reaction available for operation of said regeneration zone and (ii) decreasing the amount of CO in the flue gas.

Other objects and embodiments of the present invention encompass details about CO conversion promoters, amounts of a CO conversion promoter to be added, methods of adding a CO conversion promoter to the regeneration zone, and operating conditions all of which are hereinafter disclosed in the following discussion of each of these facets of our invention.

DESCRIPTION OF THE INVENTION

At the outset, the definition of various terms used herein will be helpful to an understanding of the method of our invention.

The term "hydrocarbon reaction zone" as used herein is that portion of FCC unit in which a hydrocarbon feed stream is contacted with regenerated catalyst at cracking conditions to produce a mixture of FCC product components, coke-contaminated (or spent) catalyst, and perhaps unreacted feed. Typical FCC product components after separation in equipment downstream of the hydrocarbon reaction zone are: $C_2$-fuel gas, $C_3$ and $C_4$ fractions, a gasoline fraction, light cycle oil, and clarified slurry oil. After separation from product components at least a portion of spent catalyst is directed to the regeneration zone. The terms "coke-contaminated catalyst" or "spent catalyst" are used interchangeably and mean catalyst withdrawn from a hydrocarbon conversion zone because of reduced activity caused by coke deposits. Spent catalyst passing into the regeneration zone can contain anywhere from a few tenths up to about 5 wt.% of coke, but typically in FCC operations spent catalyst will contain from about 0.5 to about 1.5 wt.% coke.

The term "regeneration zone" means that portion of the FCC unit into which an oxygen-containing regeneration gas and at least a portion of spent catalyst are passed in which at least a portion of coke is removed from spent catalyst by oxidation to produce regenerated catalyst and a flue gas containing $CO_2$ and CO. "Regenerated catalyst" means catalyst from which at least a portion of coke has been removed by oxidation. Regenerated catalyst produced when our method is employed will generally contain less than about 0.3 wt.% coke and more typically will contain from about 0.01 to about 0.15 wt.% coke. The term "regeneration gas" as used in this specification shall mean, in a generic sense, any gas which is to contact catalyst or which has contacted catalyst within the regeneration zone. Specifically, the term "oxygen-containing regeneration gas" shall mean a regeneration gas containing free or uncombined oxygen, such as air or oxygen enriched or deficient air, which passes into the regeneration zone to allow oxidation of coke from the spent catalyst and conversion of CO. The term "flue gas" shall mean regeneration gas which has contacted catalyst within the regeneration zone and which passes out of the regeneration zone. Flue gas will contain nitrogen, free-oxygen, carbon monoxide, carbon dioxide and water. Because CO and $CO_2$ concentrations are used in making routine FCC process calculations and since CO is a potential fuel which can be burned within the regeneration zone or an external CO boiler or perhaps both and additionally because air pollution emission limitations may exist for CO, the flue gas is typically characterized by the concentrations of CO and $CO_2$ or by the mole ratio of $CO_2/CO$. Depending upon the operating conditions employed within the regeneration zone, particularly the amount of oxygen-containing regeneration gas passed into the regeneration zone, the concentrations of CO in this gas can vary over a wide range of from a few hundred parts per million or less up to about 15 vol.% or more and the concentration of $CO_2$ can vary from about 5 vol.% to about 20 vol.%. When the regeneration zone is operated at conditions to essentially preclude controlled oxidation of CO within the regeneration zone the concentrations of CO and $CO_2$ will be approximately equal, each within the range of from about 7 to about 15 vol.%, and the $CO_2/CO$ mole ratio will be in the range of from about 0.8 to about 1.5. When the regeneration zone is operated at conditions to achieve partially complete oxidation of CO, the concentration of CO will be lower than that of $CO_2$ and more specifically the $CO_2/CO$ mole ratio will typically be from about 1.5 to about 100. When the regeneration zone is operated at conditions to achieve essentially complete combustion of CO within the regeneration zone the CO concentration will typically be less than about 1000 ppm. and preferably less than 500 ppm. and the $CO_2/CO$ mole ratio will be greater than about 100.

The terms "dense-phase" and "dilute-phase" are commonly-used terms in the art of FCC to generally characterize catalyst densities in various parts of the regeneration zone or the hydrocarbon-reaction zone. While the demarcation density is somewhat ill-defined, as the term "dense-phase" is used herein it shall refer to regions within the regeneration zone where the catalyst density is greater than about 5 $lb/ft^3$ and as "dilute-phase" is used herein it refers to regions where the catalyst density is less than about 5 $lb/ft^3$. Usually the dense-phase density will be in the range of from about 5 to 35 $lb/ft^3$ or more and the dilute-phase density will be much less than 5 $lb/ft^3$ and in the range of from about 0.1 to about 3 $lb/ft^3$. Catalyst densities within regeneration zones are commonly measured by measuring pressure or head differences across pressure taps installed in the vessels and spaced at known distances apart.

The term "afterburning" as generally understood by those skilled in the art means the unintentional, uncontrolled oxidation of CO to $CO_2$ in the dilute-phase region of the regeneration zone or the flue gas line, where there is little catalyst available to act as a heat sink. Since the heat of reaction of CO oxidation is very exothermic (about 4350 BTU/lb. CO oxidized), afterburning can therefore result in severe damage to catalyst separation devices located in the dilute-phase. Generally afterburning is characterized by a rapid temperature increase and occurs during periods of unsteady state operations or process "upset". It is, therefore, usually of short duration until steady state operations are resumed.

In contrast to afterburning, the terms "controlled conversion of CO" or "controlled oxidation of CO" shall refer to the intentional, controlled and sustained oxidation of CO in the presence of sufficient catalyst to absorb at least a portion of the heat of reaction thereby recovering at least a portion of the heat of reaction and precluding damage to regeneration zone equipment. Depending upon the operating conditions employed, the controlled oxidation of CO can be partially complete or essentially complete. "Partially complete" shall mean that the CO concentration in the flue gas has been reduced such that the $CO_2/CO$ mole ratio of the gas is in the range of from about 1.5 to 100. "Essentially complete" conversion of CO shall mean that the CO concentration of the gas has been reduced such that the $CO_2/CO$ mole ratio is greater than about 100. Typically essentially complete CO conversion will produce CO concentrations less than about 1000 ppm. and more preferably less than about 500 ppm.

The terms "CO conversion promoter" or "CO oxidation promoter" or simply "promoter" shall mean a substance which catalyzes the oxidation of CO to $CO_2$. With a CO conversion promoter the kinetic rate constant for the oxidation of CO to $CO_2$ may be increased typically from 2 to 5 times or even much more. Thus a faster rate of CO conversion can be obtained at conversion conditions in the presence of a CO conversion promoter than can be obtained at the same conversion conditions without the promoter. Conversely the same rate of CO conversion can be obtained at conversion conditions (such as temperature) which are less severe than those required without the CO conversion promoter.

The amount of CO oxidation promoter added to a regeneration zone may be expressed as that required to produce some desired change in a variable or it may be expressed in terms of circulating catalyst inventory or in terms of catalyst circulation rate or in terms of fresh cracking catalyst make-up rate or perhaps in terms of a barrel of feedstock. In this specification an amount of promoter is typically expressed as that amount required to produce a desired change in a variable such as temperature, CO concentration or residual carbon concentration or is expressed as wt. ppm. of circulating catalyst inventory. The term "circulating catalyst inventory" means that amount of cracking catalyst in the FCC process which can be circulated from the regeneration zone to the hydrocarbon reaction zone and back again. It differs from the total cracking catalyst inventory because there is usually some portion of the total inventory that is unavailable for circulation, such as that portion of the total inventory typically located in the cone section of the regeneration zone under the pipe grid.

With these terms now in mind, we consider briefly typical present-day FCC operations with particular emphasis on the regeneration zone operation. Present-day FCC operations have achieved a significant reduction in coke yield by the wide-spread use of crystalline aluminosilicate cracking catalysts and by the use of short hydrocarbon-catalyst contact times as exemplified by riser cracking. While this achievement has resulted in higher yields or more valuable gaseous and liquid products, it obviously decreased the amount of solid fuel available to be burned in the regeneration zone to supply the process heat balance requirements. Recent prior art processes recognized that by burning CO, produced by the oxidation of coke, within the regeneration zone and by recovering at least a portion of the exothermic heat of reaction, a sufficient amount of heat was now available for the heat balance requirements imposed by a wide range of operating conditions and feedstocks. Such CO burning also made possible further reductions in coke yields and increases in gaseous and liquid product yields and permitted reductions in or elimination of feed preheat while at the same time eliminating a CO pollution problem without the need for an external CO boiler. Typical presentday regeneration zones comprise a single cylindrical vessel containing a dilute phase in the upper portion of the vessel in which are located cyclone separation devices and a dense phase in the lower portion of the vessel. Spent catalyst enters the side or bottom of the vessel and fresh regeneration gas enters the bottom of the vessel and is dispersed within the dense phase by a pipe grid or perforated plate arrangement. Coke is oxidized to produce regenerated catalyst and flue gas containing CO and $CO_2$ and CO may be oxidized in the presence of sufficient catalyst to recover at least a portion of the heat of combustion. Flue gas containing entrained catalyst passes upward out of the dense phase into the dilute phase where cyclone separation devices separate entrained catalyst and direct it toward the dense phase and direct separated flue gas out of the regeneration zone. Constraints or limitations on the operation of the regeneration zone include air blower capacity, cyclone separator loading limitations, flue gas CO and particulate emission limitations, and vessel temperature limitations. During regeneration zone operation the refiner is primarily concerned with and closely monitors the degree of catalyst regeneration, the regeneration zone temperatures and the concentration of CO and particulates in the flue gas. Specifically, it is typical refinery practice to periodically withdraw regenerated catalyst samples and analyze them, by methods well known to the art, for residual carbon content as a measurement of the degree of catalyst regeneration and an indication of the cracking activity of the regenerated catalyst. Regeneration zone temperatures are routinely measured, typically by means of thermocouples, and recorded to detect changes in operation and to ensure that vessel metallurgy limitations are not exceeded. Additionally it is typical practice to periodically (or continuously) sample and analyze the flue gas for the concentrations of CO, $O_2$, $CO_2$ and particulate matter. Gas analyses may be by any method or methods known and used in the art, including the Orsat method, gas chromatography methods and mass spectroscopy methods. Particulate material may be determined by the opacity measurements or by other methods of analyses known to the art. Results from gas analyses can be used to calculate, by carbon-nitrogen-oxygen balance, such data as coke composition, coke burning rate, oxygen-containing regeneration gas requirement, heat of combustion of coke, and the amount of CO which may be burned in an external CO boiler or in the FCC regeneration zone or perhaps in both. Before the flue gas can be vented directly to the atmosphere the refiner must also know the CO and particulate concentrations to determine if the flue gas meets local air pollution emission limitations. The concentration of $O_2$ in the flue gas is important to ensure that the amount of oxygen-containing regeneration gas being supplied to the regeneration zone is sufficient to support the degree of CO combustion desired, whether it is partially complete or essentially complete, but not in such large excess as would be an unnecessary use of oxygen-containing regeneration gas blower capacity.

Carbon monoxide oxidation promoters which can be used include metals of Groups IB, IIB, VB, VIB, VIIB, and VIII of the Periodic Table of Elements and compounds thereof. Preferred CO oxidation promoters, however, are the noble metals and compounds thereof because of their higher activity for CO oxidation. Very small quantities of these promoters are therefore required to achieve the desired results. The term "noble metals" as commonly understood and used herein are the metals gold, silver, mercury, platinum, palladium, iridium, rhodium, ruthenium and osmium. Particularly preferred promoters are platinum and palladium and compounds thereof. The oxidation promoter will be supported on particles of a support or base material comprising a refractory inorganic oxide such as, for example, particles of alumina, silica, silica-alumina, silica-zirconia, silica-magnesia or fluid catalytic cracking catalysts themselves. We have surprisingly found, however, that the support material itself has strong influence on the performance of the supported CO oxidation promoter and that some support materials are significantly better than others when the promoter-support composite is used in our invention. More specifically we have found that the best results are obtained using particles of high-purity alumina as the support material for the promoter. Such alumina is therefore the preferred support material. High-purity alumina will preferably have a purity of about 95 wt.% or higher. Such alumina is readily available from a variety of commercial sources.

The particles of base material containing the promoter may have an average particle diameter of from about ¼-inch or larger to less than about 5 microns but preferably the average particle diameter will be about the same as that of the fluid cracking catalyst being used in the FCC process and more specifically within the range of from about 40 to about 60 microns. The particle size distribution will also preferably be about the same as that of the fluid cracking catalyst and within an overall particle size range of from about 1 to about 200 microns in size. When particles of supported promoter considerably larger than the cracking catalyst are employed, particularly those of about ¼ inch or greater, they may be retained in the regeneration zone in a fixed bed of such particles with void spaces therebetween or their motion may be restrained by the proper selection and use of fluidization velocities within the regeneration zone or by the use of separating devices such as screens which would allow particles of cracking catalyst to pass but not particles of separated promoter. In either situation such particles of supported promoter would not pass with the regenerated cracking catalyst from the regeneration zone to the hydrocarbon reaction zone but would remain in the regeneration zone. When particles of supported promoter having the preferred particle size are added to the regeneration zone by the methods of our invention it is expected that they will pass in admixture with regenerated catalyst from the regeneration zone to the hydrocarbon reaction zone and pass back again to the regeneration zone from the hydrocarbon reaction zone with spent catalyst. The supported CO oxidation promoter will generally be prepared by impregnating, by methods well known to the catalyst art, the support or base material with an aqueous solution comprising a salt of one of the metals mentioned above. Suitable water-soluble metal compounds include the metal halides, preferably chlorides, nitrates, amine halides, oxides, sulfates, phosphates and other water-soluble inorganic salts. Specific examples of water-soluble compounds are chloroplatinic acid, palladic acid, palladium chloride, ruthenium tetrachloride, rhodium trichloride, rhodium nitrate and osmium trichloride. Prior to being impregnated with the salt solution the support material may be dried or calcined by heating to a temperature of from about 300° to about 1200° F. Subsequent to impregnation the support material will usually be dried in an oxidizing atmosphere of from about 300° to about 1000° F. to remove excess water and then be subjected to a reducing atmosphere of hydrogen at a temperature of from about 400° F. to about 1200° F. to reduce the metal compound to elemental metal. The amount of a promoter, as elemental metal, impregnated on the support can be from about 0.001 wt.% up to about 10 wt.% or more of the supported promoter depending on the particular promoter, the support material used, and the equipment available to add the supported promoter to the regeneration zone. The preferred concentration of a noble metal promoter as elemental metal will be from about 0.05 wt.% up to about 2 wt.% of the support material so that the amount of supported promoter to be added to the regeneration zone will be quite small and therefore easily handled.

It is a feature of the method of our invention in all of its embodiments that a supported CO oxidation promoter is added to the regeneration zone independently of the cracking catalyst to achieve maximum economy and operating flexibility. The supported promoter may be added to the regeneration zone continuously or intermittently by solids-handling equipment well known to the chemical art. Automatic weighing and delivery devices of the type presently being used to add makeup cracking catalyst to regeneration zones may be used, for example, to add the supported promoter to the regeneration zones. As another example particles of supported promoter may be pressured out of small containers placed on a weighing device and attached with piping or tubing to a torch-oil nozzle or to a probe inserted through an existing vessel pressure tap. Flow can be controlled with a valve located on the connecting piping. Alternatively the particles of supported promoter could be slurried in a liquid such as water and pumped out of a container with a small pump into the regeneration zone.

To best insure maximum utilization of the small amounts of supported promoter that are required, applicants prefer that the addition of the promoter be made to the regeneration zone. Adding the supported promoter directly to the regeneration zone, where CO oxidation to be catalyzed is occurring, produces an almost immediate increase in CO combustion thereby making available for operation of the regeneration zone a controlled quantity of exothermic heat of reaction and decreasing the concentration of CO in the flue gas. The supported CO conversion promoter may be added to the dense phase or to the dilute phase of the regeneration zone. While the promoter may be added through multiple addition points we have found that satisfactory results can be obtained when only one addition point is used. The typical regeneration zone vessel contains a number of pressure taps and torch oil nozzles any one or more of which can serve as an addition point and thus very little modification to the vessel itself is required before our method can be used.

One embodiment of our invention is a method for regenerating coke-contaminated catalyst with simultaneous carefully-controlled combustion of CO. In this embodiment of our invention coke-contaminated catalyst is introduced into the regeneration zone and a supported CO oxidation promoter is added to the regeneration zone independently of the coke-contaminated catalyst in an amount selected to promote the combustion of CO to $CO_2$. More specifically the amount of supported promoter added will be that sufficient to provide a promoter concentration of from about 0.1 to about 25 wt. ppm. of the circulating catalyst inventory on an elemental metal basis and more preferably within the range of from about 0.1 to about 15 wt. ppm. of the circulating catalyst inventory. Oxygen-containing regeneration gas will then be passed into the regeneration zone in an amount to provide sufficient excess oxygen to accomplish the desired amount of CO combustion. More specifically, this amount of oxygen-containing regeneration gas will be equivalent to about 10 to about 17 pounds of air per pound of coke entering the regeneration zone per unit time, depending upon whether the CO combustion is to be partially complete or essentially complete. We have found that it is preferred that the promoter be added first to the regeneration zone and then the oxygen-containing regeneration gas so that smooth, controlled, catalyzed conversion of CO can be initiated from the start and the risk of afterburning minimized. If that amount of oxygen-containing regeneration gas is added to the regeneration zone first and the promoter added secondly there is the risk that afterburning will be initiated first rather than the desired controlled conversion of CO in the presence of supported promoter and regenerated catalyst. A first portion of the oxygen-containing regeneration gas will then be reacted with the coke-contaminated catalyst in the regeneration zone at oxidation conditions selected to remove coke from the catalyst and to produce a flue gas containing CO and sufficient to cause combustion of CO to $CO_2$ in the presence of the supported oxidation promoter. Oxidation conditions will include, in addition to the presence of the oxygen-containing regeneration gas described above, temperatures within the range of from about 1100° F. to about 1450° F. and a pressure within the range of from about atmospheric to about 50 psig. At such conditions coke oxidation will be essentially spontaneous. Essentially simultaneously the flue gas and a second portion of the oxygen-containing regeneration gas will be contacted with the supported CO oxidation promoter at the oxidation conditions previously described thereby making a controlled quantity of exothermic heat of reaction available for operation of the regeneration zone and decreasing the amount of CO in the flue gas. The amount of supported oxidation promoter added to the regeneration zone may be that required to obtain certain desirable results, such as a desired concentration of CO in the flue gas or a desired degree of catalyst regeneration or a desired regenerated-catalyst temperature or a desired regeneration-zone temperature. When the amount of supported CO oxidation promoter is to be added to achieve such a result, promoter will usually be added in small increments and the desired dependent variable — whether CO concentration or residual carbon concentration on regenerated catalysts, or a temperature — measured and compared with the desired result to determine whether another increment of supported CO oxidation promoter is needed. Specifically, if after adding a small increment of supported promoter to the regeneration zone the measured concentration of CO in the flue gas or the concentration of residual carbon on regenerated catalyst or the regenerated-catalyst temperature or a regeneration-zone temperature is not within a predetermined range for each, a second increment of supported promoter will be added and if necessary additional increments will be added until the measured variable falls within the predetermined range. Adding the supported promoter in several small increments, each over a relatively short period of time of from a few minutes to a few hours, allows the refiner to more closely control and monitor the operation of the regeneration zone to achieve the desired result. When the supported promoter is added in several increments the total amount of promoter added will be within the ranges previously described. Where the desired variable to be controlled is a dilute-phase temperature, such as a flue gas temperature, an amount of diluent gas can also be added in conjunction with the supported oxidation promoter to enable control of the temperature below a predetermined level. The rate of diluent gas will be increased in increments and the amounts of supported oxidation promoter will be increased in increments until the temperature is within a predetermined range. The diluent gas will usually be oxygen-containing regeneration gas. Once the measured variable is within or less than the predetermined range for that variable then supported promoter will be added continuously or intermittently as necessary to maintain the measured variable within the predetermined range. While the amounts of promoter required to maintain a variable within a predetermined range can vary somewhat from unit to unit and is best determined by operating experience on a particular unit, we have found that the amount of supported promoter necessary to maintain a variable within a predetermined range will be that which is sufficient to provide a promoter concentration, on an average daily basis, of from about 0.005 to about 10 wt. ppm. of the circulating catalyst inventory on an elemental metal basis.

Other embodiments of our invention are specific, independent methods of control intended to be employed after initial startup of the FCC process and after reasonably steady-state process operation has been achieved. Specifically, in one embodiment our invention is, in a process for catalytically cracking a hydrocarbon feed stream wherein coke-contaminated catalyst and oxygen-containing regeneration gas are being passed into a regeneration zone maintained at oxidizing conditions and coke is being oxidized to produce regenerated catalyst and a flue gas containing $CO_2$ and CO, a method of controlling the CO concentration in the flue gas within a predetermined CO concentration range; in another embodiment our invention is, in such a process, a method of controlling a regeneration-zone temperature within a predetermined range; and, in another embodiment our invention is, in such a process, a method of controlling the concentration of residual carbon on regenerated catalyst within a predetermined range. Such control methods can be employed by a refiner independently of each other. For instance, one refiner may be primarily interested in controlling the CO concentration in the flue gas within a predetermined range and, if the regeneration zone metallurgy is such that expected temperatures pose no problem, he will accept the regeneration zone temperatures and degree of regeneration that result when the CO concentration is controlled. Another refiner may be primarily concerned about regeneration-zone temperatures because of metallurgy limitations. In one embodiment of our invention he can control a regeneration-zone temperature within a predetermined range and he will accept the flue gas CO concentration and degree of regeneration that result from such control. In each of these control methods, a supported CO oxidation promoter is first passed to the regeneration zone and then oxygen-containing regeneration gas is passed to the regeneration zone in an amount stoichiometrically sufficient to convert at least a portion of the CO to $CO_2$. As previously mentioned it is preferred that the supported promoter be added first to avoid the risk of afterburning. At least a portion of the CO is then converted at conversion conditions including the presence of the supported CO oxidation promoter and regenerated catalyst to produce flue gas containing $CO_2$ and CO. Conversion conditions will include a temperature within the range of from about 1100° F. to about 1450° F. and a pressure within the range of from about atmospheric to about 50 psig. Then, depending upon the control method, the flue gas will be analyzed to determine a measured CO concentration which will be compared with a predetermined CO concentration range or a regeneration-zone temperature will be measured and compared with a predetermined regeneration-zone temperature range or regenerated catalyst will be analyzed to determine a measured residual carbon concentration which will be compared to a predetermined residual carbon concentration range. Thereafter supported promoter will be passed to the regeneration zone in amounts to maintain either the CO concentration or a regeneration-zone temperature or a residual carbon concentration within their respective predetermined ranges. The initial amount of supported promoter added to the regeneration zone will preferably be added in small increments as previously described until the desired result is achieved. The total of such increments will typically be such as to provide a promoter concentration of from about 0.1 to about 25 wt. ppm. of the circulating catalyst inventory on an elemental metal basis and more typically within the range of from about 0.1 to about 15 wt. ppm. of the circulating catalyst inventory. The amount of supported promoter necessary to maintain a measured variable within a predetermined range will typically be that which is sufficient to provide a promoter concentration, on an average daily basis, of from about 0.005 to about 10 wt. ppm. of the circulating catalyst inventory on an elemental metal basis.

The type of cracking catalyst used in FCC processes employing the methods of this invention is not critical and can be any type of cracking catalyst used or intended for use in the FCC process including the amorphous catalysts or crystalline aluminosilicate catalysts or mixtures of the two. Of these two broad types of cracking catalysts, those comprising crystalline aluminosilicates are preferred because of the reduced coke yields and increased gaseous and liquid product yields they produce as compared to those obtained with amorphous catalysts. Obviously, those FCC catalysts now being offered and used commercially which contain a CO promoted as a component of the catalyst need not be used in the methods of our invention. Besides being considerably more expensive than non-promoter catalysts, such catalysts, as previously pointed out, do not offer the refiner the flexibility of our invention. Since CO is now oxidized as a fuel in addition to coke within the regeneration zone and at least a portion of the heat of CO combustion is recovered within the regeneration zone, the cracking system of the FCC process can now be as selective for more valuable products as the hydrocarbon conversion zone operating conditions and the cracking catalyst will permit. Hydrocarbon conversion zone operating conditions will therefore be selected for maximum gaseous and liquid product yields and will typically include a temperature within the range of from about 800° F. to about 1100° F., a pressure within the range of from about atmospheric to about 50 psig., a catalyst to oil ratio of from about 3 to about 20 and a hydrocarbon residence time in contact with catalyst of from about 1 to about 30 seconds and more preferably from about 1 to about 10 seconds. Feedstocks used in FCC processes employing the method of this invention need be no different than those used in FCC processes not employing our method and can include any conventional hydrocarbon feedstock such as naphthas, gas oils, light and heavy distillates, residual oils and the like.

The following example is intended for illustration purposes only and references to specific promoters, concentrations of promoters, operating conditions or methods of addition of supported promoters to the regeneration zone are not to be construed as unnecessary limitations upon the scope and spirit of the claims attached hereto.

EXAMPLE

This example describes pilot plant regeneration-zone tests that were performed to establish the effectiveness of a particular supported CO oxidation promoter in an FCC regeneration zone for reducing the concentration of CO in the flue gas. The tests were conducted using a vertical tubular vessel the upper end of which was fitted with a porous stainless steel filter for confining within the vessel during the operation sequence the cracking catalyst sample that was loaded into the vessel and the lower end of which contained an inlet means for the fluidizing medium (nitrogen or air). Provision was made to heat the vessel to a constant temperature and chromatographic equipment was provided to continuously sample and analyze the flue gas from the vessel for CO, $CO_2$ and $O_2$. A chromatographic trace for each was recorded thereby providing instantaneous analyses to characterize the combustion of CO during the test. A specific $CO_2/CO$ ratio, referred to as the minimum $CO_2/CO$ ratio, was calculated from the chromatographic traces for each test by first determining the maximum CO concentration for the test (which usually occurred within 2 to 3 minutes after the combustion was initiated), determining the $CO_2$ concentration at the instant of maximum CO concentration and then calculating the $CO_2/CO$ ratio for the concentrations thus determined. The ratio is referred to as the minimum $CO_2/CO$ ratio because we have observed from many such regeneration tests that if instantaneous $CO_2/CO$ ratios were plotted against elapsed time for each test a curve would be generated which would pass through a minimum $CO_2/CO$ ratio having a value as calculated by the method explained above. This minimum $CO_2/CO$ ratio we have found best characterizes the performance of any supported CO promoter in catalyzed CO combustion.

Two supported promoters were prepared by impregnating two different support materials with aqueous solutions of chloroplatinic acid to give 1 wt.% Pt on each support material. Specifically, each base material was immersed for about ½ hour in impregnating solution contained in a steam-jacketed evaporating dish and the impregnated support was then dried by applying 35 psig. to the steam jacket and maintaining that pressure for 3 hours. The dried impregnated support materials were then each reduced with hydrogen for two hours at 1050° F. The first support material was equilibrium fluid cracking catalyst, comprising a zeolite incorporated into a silica-alumina matrix, which was withdrawn from the regeneration zone of an operating commercial unit while the second base material was ground alumina having about the same particle size distribution as the fluid cracking catalyst.

All of the tests were run on 500 gram samples of the equilibrium catalyst described above. Each sample was first "spent" by passing gas oil feed over the equilibrium catalyst sample in a pilot-plant-scale hydrocarbon reaction zone which was operated at a standard set of conditions with a predetermined sequence of operating steps. Each spent catalyst sample contained about 0.9 wt.% coke.

For Test 1 no supported promoter was used; the test was conducted to establish a basis for comparison with subsequent tests where a supported promoter was employed. A 500 gram sample of spent catalyst was loaded into the vessel and fluidized with nitrogen entering the bottom of the vessel while the system was heated to a temperature of 1100° F. At a specified time nitrogen was replaced with air thereby initiating the oxidation of coke. The flue gas from the vessel was analyzed for $CO_2$, CO and $O_2$ by the chromatographic equipment and from the traces for $CO_2$ and CO the minimum $CO_2/CO$ ratio was calculated. To establish some measure of the reproducibility of the results obtained by the test method, the test was repeated with separate samples of spent catalyst a total of four times. Results are shown in Table 1 below. For Tests 2 and 3 the two supported CO oxidation promoters described above were used. More specifically, 0.2 gram of FCC equilibrium catalyst containing 1 wt.% Pt was added to and mixed with 500 gram samples of spent catalysts for Test 2 and 0.2 gram of ground alumina containing 1 wt.% Pt was added to and mixed with 500 gram samples of spent catalyst for Test 3. Such amounts were chosen so that the mixture would contain approximately 4 ppm. promoter as Pt metal. Because of the difficulty in injecting the very small amounts of supported promoters into the regeneration test vessel during or just before coke oxidation these 0.2 gram amounts of supported promoters were mixed with the spent catalyst samples and the mixtures were then loaded into the regeneration vessel. It will be understood that when our invention is used on commercial FCC units containing many tons of fluid cracking catalyst, amounts of supported oxidation promoter can be easily injected into the regeneration zone by methods previously described to achieve a desired promoter concentration in the regeneration zone or to achieve a desired CO concentration, regeneration-zone temperature or residual coke concentration on regenerated catalyst. To determine how quickly the Pt promoter lost effectiveness for reducing the CO concentration in the flue gas, the mixture of supported promoter and regenerated catalyst produced by the regeneration test was "spent" by the method described above and the regeneration test was repeated for a second cycle. Like Test 1, Test 2 was repeated with separate samples of spent catalyst and separate amounts of supported promoter. Test 3 was conducted in the same manner as Tests 1 and 2 except that seven cycles were performed with the same mixture of FCC catalyst and Pt promoter supported on alumina to determine some measure of the rate of deterioration in CO-burning activity of the promoter in the FCC process. Results for Test 2 and 3 are also shown in Table 1 below.

TABLE I

REGENERATION TEST RESULTS WITH AND WITHOUT A SUPPORTED OXIDATION PROMOTER

| Cycle | Minimum $CO_2/CO$ Ratios | | | | | | |
|---|---|---|---|---|---|---|---|
| | 1 | 2 | 3 | 4 | 5 | 6 | 7 |
| Test 1 (No supported promoter) | 3.3 | — | — | — | — | — | — |
| | 2.5 | — | — | — | — | — | — |
| | 3.1 | — | — | — | — | — | — |
| | 3.0 | — | — | — | — | — | — |
| Test 2 (0.2 g of FCC equilibrium catalyst containing 1 wt.% Pt added to spent catalyst sample) | 5.15 | 2.65 | — | — | — | — | — |
| | 8.30 | 3.20 | — | — | — | — | — |
| | 4.22 | — | — | — | — | — | — |
| Test 3 (0.2 g of alumina containing 1 wt.% Pt added to spent catalyst | 76.2 | 97.2 | X | X | X | X | 30.1 |

These results show that Pt promoter supported on alumina is much superior to the same concentration of Pt promoter supported on a typical FCC catalyst comprising a zeolite in an amorphous silica and alumina matrix. The first-cycle minimum $CO_2/CO$ ratios for Test 2 ranged from 4.22 to 8.30 and the second-cycle ratios were 2.65 and 3.20 so about half of the first cycle CO oxidation activity had been lost by the end of the second cycle. The first-cycle minimum $CO_2/CO$ ratio for Test 3 was more than 10 times those for Test 2 and at the end of seven cycles the CO oxidation activity of the Pt supported on alumina, as measured by the minimum $CO_2/CO$ ratio, was still many times that of Pt promoter supported on FCC catalyst used in Test 2. Electron microscope photographs of the two supported promoters used in Tests 2 and 3 indicate that the Pt on the FCC catalyst is confined to clusters mainly on the surface while on alumina the Pt appears more evenly distributed.

We claim as our invention:

1. A method for regenerating a coke-contaminated hydrocarbon conversion catalyst with simultaneous carefully-controlled combustion of CO which comprises the steps of:
   (a) passing said coke-contaminated catalyst containing from about 0.2 to about 1.5 wt. % coke from a hydrocarbon conversion zone into a regeneration zone;
   (b) adding to the regeneration zone, independently of said coke-contaminated hydrocarbon conversion catalyst and free of reactor feed stock in an amount selected to promote the combustion of CO to $CO_2$, a CO oxidation promoter consisting essentially of about 0.001 wt. % to about 10.000 wt. % platinum supported on alumina possessing a particle size of from about 1 micron to about 200 microns, said promoter being present in an amount of from about 0.1 to about 25 wt. ppm of the circulating catalyst inventory calculated on an elemental metal basis;
   (c) passing oxygen-containing regeneration gas into said regeneration zone in an amount selected to burn said coke from said coke-contaminated hydrocarbon conversion catalyst and to provide sufficient excess oxygen to accomplish the desired amount of CO combustion;
   (d) reacting a first portion of the oxygen-containing regeneration gas with said coke-contaminated hydrocarbon conversion catalyst in said regeneration zone at oxidation conditions which are selected to remove said coke from said coke-contaminated hydrocarbon conversion catalyst and to produce a flue gas containing CO and which are sufficient to cause combustion of CO to $CO_2$ in the presence of said independently added oxidation promoter;
   (e) simultaneously contacting said flue gas and a second portion of the oxygen-containing regeneration gas with said CO oxidation promoter in said regeneration zone in the presence of regenerated catalyst at said oxidation conditions, thereby (i) making a controlled quantity of exothermic heat of reaction available for operation of said regeneration zone and (ii) decreasing the amount of CO in flue gas to less than 1000 ppm; and,
   (f) passing said platinum-alumina CO-promoter in admixture with said regenerated catalyst from said regeneration zone to the hydrocarbon reaction zone and back again to said regeneration zone.

2. A method as defined in claim 1 wherein the amount of platinum supported CO oxidation promoter added to said regeneration zone is selected to produce flue gas containing CO in an amount less than 500 ppm.

3. A method as defined in claim 1 wherein the amount of platinum supported on alumina CO oxidation promoter added to said regeneration zone in step (b) is selected to release an amount of exothermic heat of reaction sufficient to raise the average combustion temperature in said zone to a level effective to produce a regenerated catalyst containing residual carbon in an amount less than or equal to a predetermined value.

4. A method as defined in claim 1 wherein the amount of platinum supported on alumina CO oxidation promoter added to said regeneration zone in step (b) is selected to release an amount of exothermic heat of reaction sufficient to raise the temperature of the regenerated catalyst to a predetermined level.

5. A method as defined in claim 1 wherein the amount of platinum supported on alumina CO oxidation promoter added to said regeneration zone in step (b) is adjusted to a value sufficient to insure that substantially all of the heat released from the exothermic combustion of carbon monoxide occurs in the presence of regenerated catalyst thereby enabling control of the temperature of the flue gas below a predetermined level.

6. A method as defined in claim 1 wherein the amount of platinum supported on alumina CO oxidation promoter added to said regeneration zone in step (b) is adjusted in conjunction with an amount of diluent gas passed to said zone to enable control of the temperature of the flue gas effluent below a predetermined level.

7. In a process for catalytically cracking a hydrocarbon feed stream wherein coke-contaminated cracking catalyst containing from about 0.2 to about 1.5 wt. % coke from a hydrocarbon conversion zone and oxygen containing regeneration gas are passed to a regeneration zone maintained at coke oxidizing conditions wherein said coke is oxidized to produce a regenerated catalyst and a flue gas containing carbon dioxide and carbon monoxide, a method of using the in situ combustion of CO to $CO_2$ to control the operation of the regeneration zone which comprises the steps of:
(a) passing to said regeneration zone, independently of said coke-contaminated cracking catalyst and free of reactor feed stock in an amount selected to initiate and sustain the combustion of CO to $CO_2$ in said zone in the presence of regenerated catalyst, a CO oxidation promoter consisting essentially of from 0.001 wt. % to about 10.000 wt. % platinum supported on alumina possessing a particle size of from about 1 micron to about 200 microns, said promoter being present in an amount of from about 0.1 to about 25 wt. ppm of the circulating catalyst inventory calculated on an elemental metal basis;
(b) thereafter adjusting the amount of oxygen-containing regeneration gas being passed to said zone to a value stoichiometrically sufficient to burn said coke from the catalyst and to convert at least a portion of the CO to $CO_2$, thereby (i) making a controlled quantity of exothermic heat of reaction available for operation of said regeneration zone and (ii) decreasing the amount of CO in the flue gas to less than 1000 ppm; and,
(c) passing said platinum-alumina CO-promoter in admixture with said regenerated catalyst from said regeneration zone to the hydrocarbon reaction zone and back again to said regeneration zone.

8. A method as defined in claim 2 wherein the amount of platinum supported on alumina CO oxidation promoter added to said regeneration zone is selected to produce flue gas containing CO in an amount less than 500 ppm.

9. A method defined in claim 7 wherein the amount of platinum supported on alumina CO oxidation promoter added to said regeneration zone in step (a) is selected to release an amount of exothermic heat of reaction sufficient to raise the average combustion temperature in said zone to a level effective to produce a regenerated catalyst containing residual carbon in an amount less than or equal to a predetermined value.

10. A method as defined in claim 7 wherein the amount of platinum supported on alumina CO oxidation promoter added to said regeneration zone in step (a) is selected to release an amount of exothermic heat of reaction to raise the temperature of the regenerated catalyst to a predetermined level.

11. A method as defined in claim 7 wherein the amount of platinum supported on alumina CO oxidation promoter added to the zone in step (a) is adjusted to a value sufficient to insure that substantially all of the heat released from the exothermic combustion of carbon monoxide occurs in the presence of regenerated catalyst thereby enabling control of the temperature of the flue gas below a predetermined level.

12. A method as defined in claim 8 wherein the amount of platinum supported on alumina CO oxidation promoter added in step (a) is adjusted in conjunction with an amount of diluent gas passed to said zone to enable control of the temperature of the flue gas below a predetermined level.

13. In a process for catalytically cracking a hydrocarbon feed stream wherein coke-contaminated cracking catalyst containing from about 0.2 to about 1.5 wt. % coke from a hydrocarbon conversion zone and oxygen-containing regeneration gas are passed to a regeneration zone maintained at oxidizing conditions and said coke is therein oxidized to produce regenerated catalyst and flue gas containing $CO_2$ and CO, a method of controlling the CO concentration in the flue gas within a predetermined CO concentration range which method comprises the steps of:
(a) passing to said regeneration zone, independently of said coke-contaminated catalyst and free of reactor feed stock in an amount selected to promote the combustion of CO to $CO_2$, a CO oxidation promoter consisting essentially of about 0.001 wt. % to about 10.000 wt. % platinum supported on alumina possessing a particle size of from about 1 micron to about 200 microns, said promoter being present in an amount of from about 0.1 to about 25 wt. ppm of the circulating catalyst inventory calculated on an elemental metal basis;
(b) passing to said regeneration zone oxygen-containing regeneration gas in an amount stoichiometrically sufficient to convert at least a portion of the CO to $CO_2$;
(c) converting in said regeneration zone, at conversion conditions including the presence of said CO oxidation promoter and regenerated catalyst, at least a portion of the CO to $CO_2$ to produce flue gas containing $CO_2$ and CO;
(d) analyzing said flue gas to determine a measured CO concentration and comparing said measured CO concentration with said predetermined CO concentration range;
(e) passing to said regeneration zone said CO oxidation promoter in amounts to maintain said measured CO concentration within said predetermined CO concentration range; and,
(f) passing said platinum-alumina CO-promoter in admixture with said regenerated catalyst from said regeneration zone to the hydrocarbon reaction zone and back again to said regeneration zone.

14. A method as described in claim 13 wherein the amount of platinum supported on alumina oxidation promoter passed into said regeneration zone in step (a) is sufficient to provide a promoter concentration of from about 0.1 to about 15 wt. ppm. of the circulating catalyst inventory on an elemental metal basis.

15. A method as described in claim 13 wherein the amount of oxygen-containing regeneration gas is equivalent to about 10 to about 17 pounds of air per pound of coke entering the regeneration zone per unit time.

16. A method as described in claim 13 wherein said conversion conditions include a temperature of from about 1100° F. to about 1450° F. and a pressure of from about atmospheric to 50 psig.

17. A method as described in claim 13 wherein the amount of platinum on alumina oxidation promoter passed into said regeneration zone in step (e) is sufficient to provide a promoter concentration of from about 0.005 to about 10 wt. ppm of the circulating catalyst inventory on an elemental metal basis.

18. In a process for catalytically cracking a hydrocarbon feed stream wherein coke-contaminated cracking catalyst containing from about 0.2 to about 1.5 wt. % coke from a hydrocarbon conversion zone and oxygen-containing regeneration gas are passed to a regeneration zone maintained at oxidizing conditions and said coke is therein oxidized to produce regenerated catalyst and flue gas containing $CO_2$ and CO, a method of controlling a regeneration zone temperature within a predetermined temperature range which method comprises the steps of:

(a) passing to said regeneration zone, independently of said coke-contaminated catalyst and free of reactor feed stock in an amount selected to promote the combustion of CO to $CO_2$, a CO oxidation promoter consisting essentially of about 0.001 wt. % to about 10.000 wt. % platinum supported on alumina possessing a particle size of from about 1 micron to about 200 microns, said promoter being present in an amount of from about 0.1 to about 25 wt. ppm of the circulating catalyst inventory calculated on an elemental metal basis;

(b) passing to said regeneration zone oxygen-containing regeneration gas in an amount stoichiometrically sufficient to convert at least a portion of the CO to $CO_2$;

(c) converting in said regeneration zone, at conversion conditions including the presence of said CO oxidation promoter and regenerated catalyst, at least a portion of the CO to $CO_2$ to produce flue gas containing $CO_2$ and CO;

(d) measuring a regeneration zone temperature to determine a measured regeneration zone temperature and comparing said measured concentration with said predetermined temperature range;

(e) passing to said regeneration zone said platinum-alumina CO oxidation promoter in amounts to maintain said measured regeneration zone temperature within said predetermined temperature range; and, (f) passing said platinum-alumina CO-promoter in admixture with said regenerated catalyst from said regeneration zone to the hydrocarbon reaction zone and back again to said regeneration zone.

19. A method as described in claim 18 wherein the amount of platinum supported on alumina oxidation promoter passed into said regeneration zone in step (a) is sufficient to provide a promoter concentration of from about 0.1 to about 15 wt. ppm. of the circulating catalyst inventory on an elemental metal basis.

20. A method as described in claim 18 wherein the amount of oxygen-containing regeneration gas is equivalent to about 10 to about 17 pounds of air per pound of coke entering the regeneration zone per unit time.

21. A method as defined in claim 18 wherein said conversion conditions include a temperature of from about 1100° F. to about 1450° F. and a pressure of from about atmospheric pressure to 50 psig.

22. A method as described in claim 18 wherein the amount of platinum supported on alumina oxidation promoter passed into said regeneration zone in step (e) is sufficient to provide a promoter concentration of from about 0.005 to about 10 wt. ppm. of the circulating catalyst inventory on an elemental metal basis.

23. A method as defined in claim 18 wherein said regeneration zone temperature is a dilute-phase temperature.

24. In a process for catalytically cracking a hydrocarbon feed stream wherein coke-contaminated cracking catalyst containing from about 0.2 to about 1.5 wt. % coke from a hydrocarbon conversion zone and oxygen-containing regeneration gas are passed to a regeneration zone maintained at oxidizing conditions and said coke is therein oxidized to produce regenerated catalyst and flue gas containing $CO_2$ and CO, a method of controlling the concentration of residual carbon on regenerated catalyst within a predetermined residual carbon concentration range which method comprises the steps of:

(a) passing to said regeneration zone, independently of said coke-contaminated catalyst and free of reactor feed stock in an amount selected to promote the combustion of CO to $CO_2$, a CO oxidation promoter consisting essentially of about 0.001 wt. % to about 10.000 wt. % platinum supported on alumina possessing a particle size of from about 1 micron to about 200 microns, said promoter being present in an amount of from about 0.1 to about 25 wt. ppm of the circulating catalyst inventory calculated on an elemental metal basis;

(b) passing to said regeneration zone oxygen-containing regeneration gas in an amount stoichiometrically sufficient to convert at least a portion of the CO to $CO_2$;

(c) converting in said regeneration zone, at conversion conditions including the presence of said CO oxidation promoter and regenerated catalyst, at least a portion of the CO to $CO_2$ to produce flue gas containing $CO_2$ and CO;

(d) analyzing regenerated catalyst to determine a measured residual carbon concentration and comparing said measured residual carbon concentration with said predetermined residual carbon concentration range;

(e) passing to said regeneration zone said platinum-alumina CO oxidation promoter in amounts to maintain said measured residual carbon concentration within said predetermined residual carbon concentration range; and, (f) passing said platinum-alumina CO-promoter in admixture with said regenerated catalyst from said regeneration zone to the hydrocarbon reaction zone and back again to said regeneration zone.

25. A method as described in claim 24 wherein the amount of platinum supported oxidation promoter passed into said regeneration zone in step (a) is sufficient to provide a promoter concentration of from about 0.1 to about 15 wt. ppm. of the circulating catalyst inventory on an elemental metal basis.

26. A method as described in claim 24 wherein the amount of oxygen-containing regeneration gas is equivalent to about 10 to about 17 pounds of air per pound of coke entering the regeneration zone per unit time.

27. A method as described in claim 24 wherein said conversion conditions include a temperature of from about 1100° F. to about 1450° F. and a pressure of from about atmospheric pressure to 50 psig.

28. A method as described in claim 24 wherein the amount of platinum supported on alumina oxidation promoter passed into said regeneration zone in step (e) is sufficient to provide a promoter concentration of from about 0.005 to about 10 wt. ppm. of the circulating catalyst inventory on an elemental metal basis.

* * * * *